United States Patent [19]

Rüede

[11] Patent Number: 4,778,981
[45] Date of Patent: Oct. 18, 1988

[54] ELECTRICALLY WELDABLE SLEEVE FOR JOINING THERMOPLASTIC PIPELINE PARTS

[75] Inventor: Ernst Rüede, Bellach, Switzerland

[73] Assignee: Von Roll AG, Gerlafingen, Switzerland

[21] Appl. No.: 796,695

[22] Filed: Nov. 12, 1985

[30] Foreign Application Priority Data

Nov. 30, 1984 [CH] Switzerland .................... 5730/84

[51] Int. Cl.⁴ ............................................. H05B 3/58
[52] U.S. Cl. ..................................... 219/535; 219/544
[58] Field of Search ............... 219/544, 535, 528, 521, 219/520, 452; 285/21

[56] References Cited

U.S. PATENT DOCUMENTS

| | | | |
|---|---|---|---|
| 3,943,334 | 3/1976 | Sturm | 219/544 |
| 4,117,311 | 9/1978 | Sturm | 219/544 |
| 4,313,053 | 1/1982 | Sturm | 219/544 |
| 4,375,591 | 3/1983 | Sturm | 219/544 |
| 4,530,521 | 7/1985 | Nyffeler et al. | 219/544 X |

Primary Examiner—E. A. Goldberg
Assistant Examiner—C. M. Sigda
Attorney, Agent, or Firm—Bachman & LaPointe

[57] ABSTRACT

The electrically weldable sleeve has a tubular sleeve member, heating elements arranged on the inner wall of the sleeve member and terminals for an energy supply. A material recess in the form of slots is provided in the edge zone of the boundary area of the heating element. This makes it possible to completely utilize the shrinkage reserve imparted to the sleeve member during the production of the sleeve, so that it is effective up to the solidification of the core of the melting zone. It also completely compensates for the volume contraction of the material linked with the solidification of the melting zone, so that the occurrence of cavities is reliably avoided. Corresponding to the axial flux of force represented by lines, the material recesses must be located at a point, which leads to no weakening of the sleeve member portions decisive for assembly and operation.

10 Claims, 2 Drawing Sheets

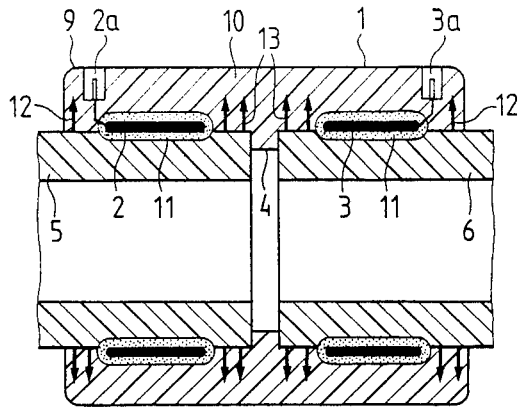
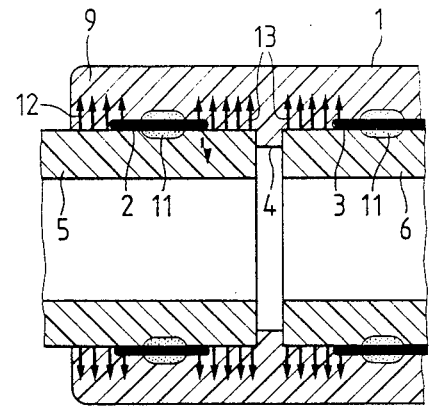
FIG. 1  FIG. 2
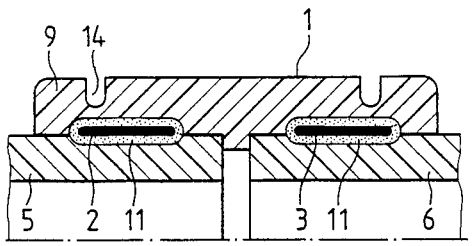
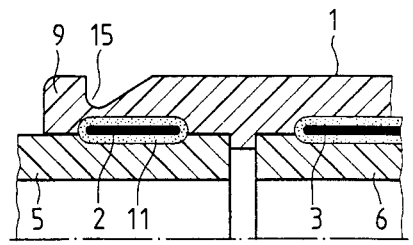
FIG. 3  FIG. 4
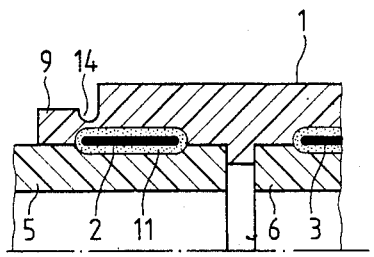
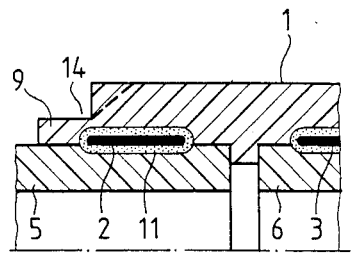
FIG. 5  FIG. 6
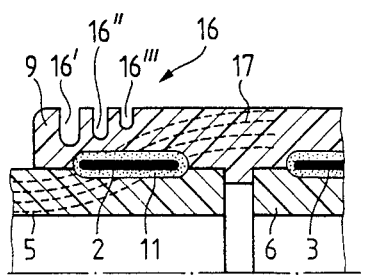
FIG. 7

ELECTRICALLY WELDABLE SLEEVE FOR JOINING THERMOPLASTIC PIPELINE PARTS

BACKGROUND OF THE INVENTION

The present invention relates to an electrically weldable sleeve for joining thermoplastic pipeline parts, which has a tubular sleeve member made from a thermoplastic material, an electrical heating element embedded into the inner wall of the sleeve member and terminals for the supply of electrical energy to the heating element. The electrical energy supplied to the electric heating element is used for producing heat for the purpose of forming a melting zone on welding the sleeve member to the portions of the pipeline parts located in the melting zone.

Electrically weldable sleeves made from the same or a similar thermoplastic material are known for joining thermoplastic pipeline parts. The term pipeline parts is understood to cover straight and curved pipeline sections, shaped pipe portions and pipeline fittings. For the purpose of joining to other pipeline parts, said pipeline parts have tubular connection pieces, on to which is placed a sleeve of the aforementioned type and is electrically welded therewith to form a drip-proof and gas tight joint. Electrically weldable sleeves of the aforementioned type are known in numerous different constructions, reference being made e.g. to U.S. Pat. Nos. 3,943,334 and 4,117,311.

If such known electrically weldable sleeves are used for joining pipeline parts, the attaining of a reliable, tight connection is dependent on different characteristics of the sleeve. A particularly important characteristic of a weldable sleeve is its capacity to shrink by releasing latent stresses during its heating occurring during the welding process, in order to remove the clearance between the weldable sleeve and the connection pieces of the pipeline parts to be welded. For this purpose it is known to impart a shrinkage reserve to the thermoplastic sleeve member during the production of the sleeve. This is released during the heating taking place during the welding process for eliminating the existing clearance between the sleeve and the connecting pieces of the pipeline parts.

Simultaneously with the release of the shrinkage reserve and the removal of the clearance between the sleeve and the connection piece of the pipeline part, a volume contraction occurs during the cooling of the welded joint in the welded zone when the molten material passes into the solid state. This volume contraction can be considerable and is e.g. approximately 20% in the case of polyolefinic materials. If the shrinkage reserve imparted to the sleeve member is not sufficient, to completely compensate for the volume shrinkage through the shape change occurring during shrinking, cavities form in the solidifying melting zone. Since as a result of the heat gradient occurring on the sleeve member, cooling advances from the edges of the melting zone towards the center thereof and there is an increase in the proportion of the sleeve member which is supported on the connecting pieces projecting into the sleeve. This supporting action of the connecting pieces acting counter to the shrinkage of the sleeve means that in the final area of the not yet solidified melting zone, the sleeve member completely follows the volume shrinkage occurring, and can compensate same by a shape change. Thus, cavities impairing the strength of the sleeve occur in the center of the melting zone. Such cavities can in particular occur in the case of relatively thick-walled sleeve members, such as conventionally occur when joining pipeline parts which are to be operated under pressure.

SUMMARY OF THE INVENTION

The problem of the present invention is to so further develop an electrically weldable sleeve of the aforementioned type that a complete welding of the sleeve member to the connection pieces in the vicinity of the solidified melting zone is reliably insured, without there being any weakening of the sleeve member in the portions vital for assembly and operation. Simultaneously, the sleeve member is to be used as an indicating means for the completion of the welding operation.

According to the invention this problem is solved in that one or more material recesses are provided in the edge areas of the sleeve member extending from the sleeve faces into the boundary area of the melting zone for insuring an adequate radial freedom of movement of the sleeve member during the welding process for compensating for the clearance between the sleeve member and the pipeline parts on the one hand and the volume reduction during the solidification of the melting zone on the other. The present invention includes an improved sleeve member, composite and method for forming same.

The invention also includes a method for utilizing the sleeve according to the invention for indicating a functionally correct performance of the welding process, in which a change to the location of the material recesses of the sleeve member is established.

BRIEF DESCRIPTION OF THE DRAWINGS

The invention is described in greater detail hereinafter relative to non-limitative embodiments and the attached drawings, wherein show:

FIG. 1 is a longitudinal section through a diagrammatically represented electrically weldable sleeve mounted on two connection pieces with two melting zones at the time when the energy supply has stopped.

FIG. 2 is a longitudinal section through a partly represented welding sleeve according to FIG. 1 with the melting zone in the final phase of the solidification of the melt produced by the energy supply.

FIGS. 3 to 13 are longitudinal sections through a partly represented welding sleeve according to FIGS. 1 and 2, but with material recesses in the vicinity of the edge zones of the sleeve member and the melting zone portion directed towards the edge zones, while forming the material recess as a slot in FIG. 3, as a notch in FIG. 4, as a slot with reduced wall thickness of the edge zone in FIG. 5, as an edge zone with a reduced wall thickness, the reduction extending into the following melting zone portion in FIG. 6, as a multiple slot in FIG. 7, as an inside wall recess in FIG. 8, as an outside wall recess in FIG. 9, as through-recesses in FIG. 10, as an interrupted circumferential slot in FIG. 11, as a slot for the optical indication of the welding process with the pressed out melt as the welding indicator in FIG. 12, and as a double slot with an identical slot width before and a non-identical slot width after the welding process in FIG. 13.

DETAILED DESCRIPTION OF THE PREFERRED EMBODIMENTS

Figure 8:
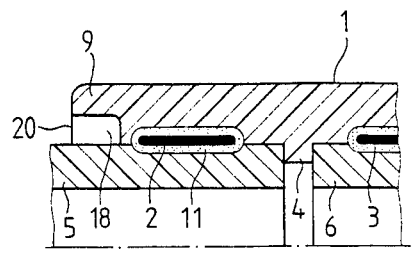
Figure 9:
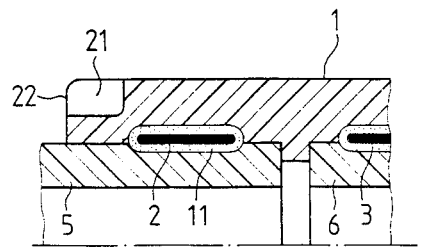
Figure 10:
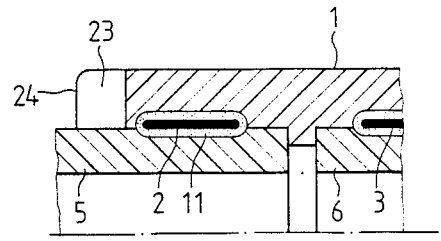

The electrically weldable sleeve shown in FIG. 1 has a sleeve member 1 and a heating means subdivided into two heating elements 2, 3 arranged in the vicinity of the inner circumference of the sleeve member 1. Sleeve member 1 is centrally provided with a web 4, which acts as a stop for two connection pieces 5, 6 on not shown pipelines.

Heating elements 2, 3 are located in the vicinity of the connection pieces 5, 6 and extend so far that the outer part of an edge zone 9 and an inner zone 10 remain unheated. Heating elements 2, 3, which are represented here as thick unbroken lines, are mostly constructed as a winding of a resistance heating wire, whose turns are arranged in spaced juxtaposed manner. However, the construction of the heating elements 2, 3 is not essential for the invention.

If the heating elements 2, 3 are supplied with electrical energy by means of terminals located in sleeve member 1 shown schematically in FIG. 1 as terminals 2a and 3a, heat is produced in heating elements 2, 3 and consequently a melting zone 11 is produced shown in dotted line form, in which the sleeve member 1 is joined to the connection pieces 5, 6. When a sufficient quantity of material of sleeve member 1 and connection pieces 5, 6 is liquefied for good welding purposes, the energy supply is cut off. The evolution of heat in melting zone 11 is accompanied by the release of the shrinkage reserve imparted to the sleeve member 1 during the manufacture of the sleeve, so that the sleeve member shrinks and engages against the connection pieces 5, 6, which now oppose the further shrinkage of sleeve member 1. This supporting effect represented by arrows 12, 13 in FIGS. 1 and 2 is relatively small at the end of the heating process, when the melting zone 11 has its greatest extension, but increases in size at the end of the energy supply, cf. arrows 12, 13 in FIG. 2, because as a result of the heat gradient heat is removed from melting zone 11 to the outside, so that there is a constant reduction in the extension of melting zone 11. As a result of the increased support action, further shrinkage of sleeve member 1 is inhibited. The consequence of this is that in the center of the melting zone cavities can form as a result of the volume contraction of the solidifying melt, and these reduce the quality of the weld.

The invention is based on the idea that said cavity formation can be avoided, if a measure is taken in the sleeve member 1, so that at the end of the solidification of the melting zone, said member retains its radial freedom of movement and consequently its shrinkage capacity to such an extent that the volume shrinkage can be made good up to the complete solidification of the melt. This measure is achieved through the construction of the sleeve member according to FIGS. 3 to 13. For reasons of simplicity, these drawings only show part of the electrically weldable sleeve and a connection piece.

This measure, which leads to a greater radial freedom of movement, essentially comprises providing one or more material recesses, which reduce the stiffening effect of the edge zones, but this is at a point of the sleeve member, which cannot lead to a strength reduction for portions which are decisive for assembly and operation.

In FIG. 3, this reduction of the stiffening effect is achieved by a slot 14 on the outer circumference of sleeve member 1 and which is located in the edge portion 9 in the vicinity of heating element 2. In FIG. 4 a notch 15 is provided at the same point in place of the slot 14 and one wall thereof extends from the edge zone 9 so as to slope over part of heating element 2.

In FIG. 5, apart from slot 14, the wall thickness of edge zone 9 is reduced by a portion of the slot depth, while in FIG. 6 it is reduced to the bottom of slot 14. In FIG. 6 the transition from the original slot 14 to the circumference of sleeve member 1 is an edge, but in the manner indicated in broken line form can also be bevelled.

FIG. 7 has a multiple slot 16 with three slots 16', 16", 16''' and different widths and depths. The multiple slot 16 can also have a different number of slots. FIG. 7 has lines 17 which, in the case of axial tensile stressing, represent the path of the flux of force between the sleeve member 1 and the connection piece 5. It is important that the slots 16 used for reducing the sleeve stiffness do not lead to any strength reduction having an unfavorable influence on operation. Thus, the depth and position of the recesses are to be matched to the location of the heating element 2 and/or melting zone 11. It must also be insured that the full thickness of sleeve member 1 comes to bear in front of the inner edge of heating element 2 and/or melting zone 11 This is appropriately made at least as thick as the wall thickness of the connection pieces 5, 6 to be welded.

In the construction according to FIG. 8, there are inside wall recesses 18 in edge zone 9 of sleeve member 1, which extend into the vicinity of heating element 2. Between the individual recesses 18 in edge zone 9 are provided guidance webs 20. Recesses 18 according to FIG. 8 can also be constructed in the form of outside wall recesses 21 according to FIG. 9. If no webs 22 are provided, the construction according to FIG. 6 is obtained. Finally, the recesses can be in the form of slots 23, which extend through the entire wall thickness of sleeve member 1 and are separated from one another by web portions 24 as in FIG. 10. The slots 23 can be relatively narrow, while the web portions 24 extend over a correspondingly larger part of the circumference.

Figure 11:
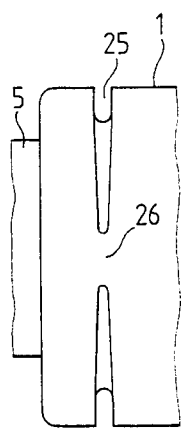

In the construction according to FIG. 11 a slot 25 is provided in the vicinity of edge zone 9 of sleeve member 1. Unlike in the construction according to FIG. 3, the slot 25 does not extend over the entire sleeve circumference and instead forms partial slots, which are separated from one another by the slot-free portions 26.

Figure 12:
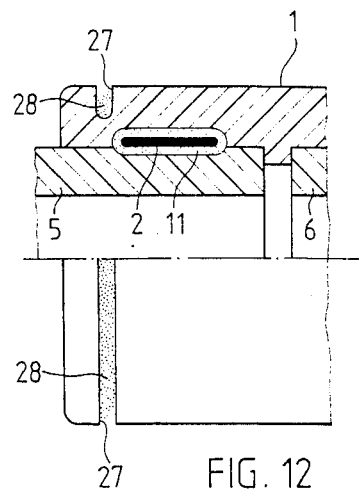
Figure 13:
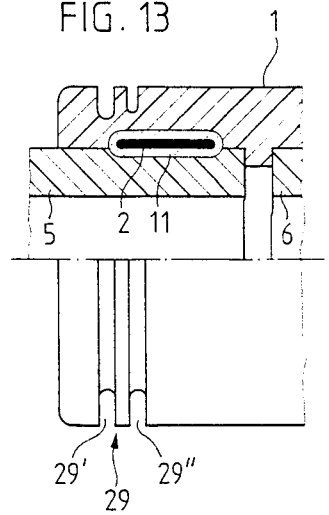

FIGS. 12 and 13 show constructions, in which the resilient point can be simultaneously used to provide an optical indication of the welding process. For this purpose, in the construction according to FIG. 12, slot 27 is made sufficiently deep to insure that during the supply of welding energy, melt 28 can pass out of welding zone 11 into slot 27. The escape of melt 28 indicates that an overpressure exists in melting zone 11 through the shrinkage of sleeve member 1 and this is a prerequisite for completely satisfactory welding.

In the construction according to FIG. 13, there is a multiple slot 29, e.g. two slots 29', 29" of the same width, whose shape changes when a pressure occurs in melting zone 11, as is e.g. shown in the upper half of FIG. 13. The two originally identical slots 29', 29" diverge from one another, e.g. in that slot 29" becomes narrower than slot 29'.

In the described constructions according to FIGS. 3 to 13, a distinction can be made between two groups. The first group covers the constructions according to FIGS. 3, 4, 7, 11, 12, and 13, which all have a frontally solid edge zone 9. This solid face can e.g. be used as a force application point during the displacement of sleeves during assembly. The other group of construction according to FIGS. 5, 6, 8, 9 and 10 achieves the increase in the resilience of the sleeve member in that the circumferential cross-section of the edge zone 9 is wholly or partly reduced and in the case of the constructions according to FIGS. 8 and 10 the axial extension of the recesses 18, 23 extends approximately up to the edge of heating element 2. However, in all the constructions the flux of force is insured in an unimpeded form through the welding point.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. An electrically weldable sleeve for joining thermoplastic pipeline parts which comprises: a tubular sleeve member with an outer circumference made from a thermoplastic material, said sleeve member having edge areas, an inner wall and outer sleeve faces thereof; an electrical heating element embedded into the inner wall of the sleeve member operative to produce heat and form a melting zone including a boundary area thereof on welding the sleeve member to pipeline parts located in the melting zone; terminals for supply of electrical energy to the heating element; and means for insuring adequate radial freedom of movement of the sleeve member during the melting process to compensate for clearance between the sleeve member and the pipeline parts and volume reduction during solidification of the melting zone, said means comprising at least one material recess provided in the edge areas of the sleeve member, each said recess extending from at least one of said outer sleeve faces into the boundary area of the melting zone and extending at least partially over the outer circumference of the sleeve member so as to insure said adequate radial freedom of movement of the sleeve member during the melting process to compensate for clearance between the sleeve member and the pipeline parts and said volume reduction during solidification of the melting zone.

2. A sleeve according to claim 1 wherein the at least one material recess in the edge areas extends wholly over the circumference of the sleeve member.

3. A sleeve according to claim 1 wherein the at least one material recess comprises at least one of a slot and a notch extending over the circumference and in the boundary area of the melting zone.

4. A sleeve according to claim 3 including several of said slots constructed with at least the same slot depths.

5. A sleeve according to claim 4 wherein said slots have different slot depths.

6. A sleeve according to claim 1 wherein the edge areas include axial recesses which form axial grooves in the outer circumference extending the wall thickness of the sleeve member, including webs positioned therebetween.

7. A sleeve according to claim 1 wherein thermoplastic pipeline parts are situated inside said tubular sleeve member in contacting relationship with said inner wall.

8. A sleeve according to claim 1 including an inner zone of said sleeve member that remains unheated.

9. A sleeve according to claim 3 including at least two slots spaced from each other.

10. A sleeve according to claim 9 wherein said slots have different widths and depths.

* * * * *